(12) United States Patent
Rover et al.

(10) Patent No.: US 7,483,390 B2
(45) Date of Patent: Jan. 27, 2009

(54) SYSTEM AND METHOD FOR DYNAMICALLY CONFIGURING AND TRANSITIONING WIRED AND WIRELESS NETWORKS

(75) Inventors: Jeremy L. Rover, Beaverton, OR (US); Amber D. Sistla, Hillsboro, OR (US); Asha R. Keddy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 798 days.

(21) Appl. No.: 10/610,989

(22) Filed: Jun. 30, 2003

(65) Prior Publication Data

US 2004/0264388 A1    Dec. 30, 2004

(51) Int. Cl.
*H04L 12/28* (2006.01)
(52) U.S. Cl. ...................................... 370/254; 370/252
(58) Field of Classification Search ....................... None
See application file for complete search history.

(56) References Cited

U.S. PATENT DOCUMENTS

| | | | |
|---|---|---|---|
| 5,751,967 A * | 5/1998 | Raab et al. ................. 709/228 |
| 5,964,837 A | 10/1999 | Chao et al. | |
| 6,047,330 A | 4/2000 | Stracke, Jr. et al. | |
| 6,061,334 A | 5/2000 | Berlovitch | |
| 6,075,776 A | 6/2000 | Tanimoto et al. | |
| 6,131,119 A | 10/2000 | Fukui | |
| 6,173,411 B1 | 1/2001 | Hirst et al. | |
| 6,349,306 B1 | 2/2002 | Malik et al. | |
| 6,404,741 B1 * | 6/2002 | Buhler et al. ................. 370/244 |
| 6,499,115 B1 | 12/2002 | Wiedeman et al. | |
| 6,651,093 B1 | 11/2003 | Wiedeman et al. | |
| 6,658,469 B1 | 12/2003 | Massa et al. | |
| 6,697,360 B1 | 2/2004 | Gai et al. | |
| 6,732,176 B1 | 5/2004 | Stewart et al. | |
| 6,741,592 B1 | 5/2004 | Edsall et al. | |
| 7,069,320 B1 | 6/2006 | Chang et al. | |
| 7,088,674 B2 | 8/2006 | MacKiewich et al. | |
| 7,092,943 B2 | 8/2006 | Roese et al. | |
| 7,383,340 B2 * | 6/2008 | Rover et al. ................. 709/227 |
| 7,386,629 B2 * | 6/2008 | Rover et al. ................. 709/238 |
| 2001/0054065 A1 | 12/2001 | Garg | |
| 2002/0065919 A1 | 5/2002 | Taylor et al. | |
| 2002/0149601 A1 | 10/2002 | Rajarajan et al. | |
| 2002/0161867 A1 | 10/2002 | Cochran et al. | |

(Continued)

FOREIGN PATENT DOCUMENTS

CN    1288602    3/2001

(Continued)

OTHER PUBLICATIONS

Pending U.S. Appl. No. 10/611,787, filed Jun. 30, 2003, inventor: Rover; Office Action dated Nov 2, 2006.

(Continued)

*Primary Examiner*—Robert W Wilson
(74) *Attorney, Agent, or Firm*—Philip A. Pedigo

(57) ABSTRACT

A network may be abstracted into four layers: a control layer, a network management layer, a verification and validation layer, and a physical network layer. The control layer interacts with the other three layers to execute network scenarios. The network management layer automatically performs network configurations and network transitions to support the network scenarios executed by the control layer.

19 Claims, 13 Drawing Sheets

U.S. PATENT DOCUMENTS

| | | |
|---|---|---|
| 2003/0069960 A1 | 4/2003 | Symons et al. |
| 2003/0088651 A1 | 5/2003 | Wilson |
| 2003/0101217 A1 | 5/2003 | Aiyoshi et al. |
| 2003/0106067 A1 | 6/2003 | Hoskins et al. |
| 2003/0112808 A1 | 6/2003 | Solomon |
| 2003/0120955 A1 | 6/2003 | Bartal et al. |
| 2003/0212781 A1 | 11/2003 | Kaneda et al. |
| 2003/0217145 A1 | 11/2003 | Mullen et al. |
| 2003/0217148 A1 | 11/2003 | Mullen et al. |
| 2004/0059813 A1 | 3/2004 | Bolder et al. |
| 2004/0093400 A1* | 5/2004 | Richard et al. ............... 709/222 |

FOREIGN PATENT DOCUMENTS

| | | |
|---|---|---|
| CN | 1335956 | 2/2002 |
| CN | 1417694 | 5/2003 |
| CN | 1422036 | 6/2003 |
| EP | 0 617 356 | 9/1994 |
| EP | 0 676 709 | 10/1995 |
| GB | 2 365 252 A | 2/2002 |
| JP | 10-173665 | 6/1998 |
| JP | 2000-156710 | 11/1998 |
| JP | 2002-515254 | 5/2002 |
| WO | WO 97/29605 | 8/1997 |
| WO | WO 00/74303 A2 | 12/2000 |
| WO | WO 00/77983 A1 | 12/2000 |
| WO | WO 03/032164 | 4/2003 |
| WO | WO 03/048933 A1 | 6/2003 |

OTHER PUBLICATIONS

International Application No. PCT/US2004/019615 Int'l Search Report & Written Opinion dated Oct. 11, 2004.
Application No. PCT/US2004/021086 Int'l Preliminary Report on Patentability, Chapter 1, dated Jan. 12, 2006.
Chien-Chung Shen: The Network as Distributed Object Database; 1998 IEEE; sponsored by the US. Army Research Laboratory; XP-000799525; pp. 540-548.
Herur: Management of Databases Using SNMP: A Framework for a Unified Database MIB; 1998 IEEE; pp. 29-32.
Int'l App. No. PCT /US2004/019698; PCT Search Report & Written Opinion dated Oct. 8, 2004.
Int'l Appl No. PCT/US2004/019699; PCT Search Report & Written Opinion dated Oct. 21, 2004.
Int'l App. No. PCT/US2004/019614; PCT Search Report & Written Opinion dated Nov. 15, 2004.
Int'l App. No. PCT/US2004/021086; PCT Search Report & Written Opinion dated Oct. 21, 2004.
Int'l App. No. PCT /US2004/019698; Int'l Preliminary Report on Patentability Chapter 1 dated Dec. 12, 2006.
Int'l Appl No. PCT/US2004/019699; Int'l Preliminary Report on Patentability Chapter 1 dated Dec. 12, 2006.
Int'l Appl No. PCT/US2004/019615; Int'l Preliminary Report on Patentability Chapter 1 dated Dec. 12, 2006.
Int'l App. No. PCT/US2004/019614; Int'l Preliminary Report on Patentability Chapter 1 dated Dec. 12, 2006.
Office Action mailed Feb. 9, 2007 for corresponding U.S. Appl. No. 10/611,951, filed Jun. 30, 2003, to Rover et al.
Office Action mailed Nov. 2, 2006 for corresponding U.S. Appl. No. 10/611,787, filed Jun. 30, 2003, to Rover et al.
Final Office Action mailed Mar. 12, 2007 for corresponding U.S. Appl. No. 10/611,787, filed Jun. 30, 2003, to Rover et al.
"Management Information Base for the Internet Protocol (IP)", draft-ietf-ipv6-rfc2011-update-02.txt, Mar. 22, 2007, 98 pages.
V. Herur et al., "Management of Databases using SNMP: A Framework for a Unified Database MIB", University of Western Sydney, Nepean Australia, 4 pages.
AutoInstall using DHCP for LAN Interfaces; Cisco IOS Release 12.1(5)T; XP-002210269; pp. 1-12, date unknown (previously submitted).
Routhier: Management Information Base for the Internet Protocol (IP); May 2004I draft.ietf-ipv6-rfc2011-update-10.txt; 144 pages (previously submitted).
InTouch 7.1 Product Data Sheet, Nov. 1999, Wonderware Corporation, Irvine, CA, USA.
"Design and Implementation of a Method of VLAN Management with SNMP", Journal of Military Communications Technology, vol. 24, No. 1, Mar. 2003.
Final Office Action mailed Apr. 30, 2008 for corresponding U.S. Appl. No. 10/611,786, filed Jun. 30, 2003, to J. Rover et al.
Chinese Patent CN 1411 213 A, filed Apr. 16, 2003, English Translation of Abstract.
Office Action mailed Oct. 18, 2007 for corresponding U.S. Appl. No. 10/611,786, filed Jun. 30, 2003, to Rover et al.

* cited by examiner

202 — [Dynamic Network Devices]

```
{ ## DeviceName    OS(WIN2K|WINXP_PRO)
  ## MAC_Address  Subnet_suffix Card_type
```

204 — [Non-Dynamic Network Devices]

StaticDevName IPAddr1 ... IPAddrN

206 — [Power Management Devices]

```
HomeAddress (A-P)
DeviceCode (1-16)  AssociatedDevice
```

208 — [Hubs]

```
##HubName
##AssociatedDevicesName
```

210 — [VLAN Configuration]

```
##switchName switchIp switchPassword controlPort
Port Num (list of ports)
AssociatedDevice (list of devices)
```

212 — [Routers]

```
{ ## routerName     password controlIP
  ## interfaceType interface suffix
```

214 — [DHCP Servers]

```
dhcpServerName password controlInterface controlAddress subnet
interface ipSuffix subnetMask routerSuffix
```

216 — [Addressing Scheme]

prefixType prefix

FIG. 2

Subnet1
Data data data...
TopologyType1
Data data data...
Device1
Data data data
PotentialMovement1
...
PotentialMovementN
...
DeviceN
Data data data
PotentialMovement1
...
PotentialMovementN
...
SubnetN
...

300

FIG. 3 proc newVlans { ipAddr passwd totalPorts controlPort vlan1 vlan2 vlan3 vlan4 }
         405      410      415           420         425

505
— SubnetGroupingType(internal, external)
515 — SubnetSubsection1
    Topology Type 1 (802.11a, 802.11b, etc)
    ...
    Topology Type N (802.11a, 802.11b, etc)
...
SubnetSubsectionN
    Topology Type 1 (802.11a, 802.11b, etc)
    ...
    Topology Type N (802.11a, 802.11b, etc)
510
— DeviceSection
    "n" DeviceTypes StartLocation

SYSTEM AND METHOD FOR DYNAMICALLY CONFIGURING AND TRANSITIONING WIRED AND WIRELESS NETWORKS

RELATED APPLICATIONS

This nonprovisional patent application is related to the following contemporaneously filed nonprovisional patent applications: U.S. patent application Ser. No. 10/611,787, entitled, "System and Method for Programmatically Changing the Physical Network Location of a Network Device;" U.S. patent application Ser. No. 10/611,596, entitled "System and Method for Describing Network Resource Availability and Associations;" U.S. patent application Ser. No. 10/611, 591, entitled "System and Method for Synchronous Configuration of Dynamic Host Configuration Protocol (DHCP) Server and Router Interfaces"; and U.S. patent application Ser. No. 10/611,786, entitled "System and Method for the Design and Description of Networks."

TECHNICAL FIELD

Embodiments of the invention generally relate to the field of networks and, more particularly, to a system and method for dynamically configuring and transitioning wired and wireless networks.

BACKGROUND

Mobile networking technologies are driving an evolution in the use and structure of networks. For example, users of mobile networking technologies expect to stay connected as they move from place to place and from network to network. Furthermore, users of mobile networking technologies expect easy and seamless network interface transitions as they move from place to place.

The term network component broadly refers to a node (e.g., a desktop, laptop, etc.) or a collection of nodes (e.g., a virtual private network, a subnet, a virtual local area network, etc.). The term node refers to a network component having a network interface. Examples of a node include switches, routers, servers, clients, workstations, laptops, handhelds, printers, hubs, and the like.

The movement of network components from place to place and network to network fosters constantly changing network infrastructures and topologies. Network components are typically configured to interact with particular network infrastructures and topologies. The term configuration can be used with respect to a network component or to an entire network. When used in association with a network component, configuration refers to the settings of software, hardware, and firmware that enable the network component to exchange information with a network. In a broader sense, configuring a network refers to configuring a plurality of network components to exchange information with one another.

Modern networking technologies increase the variety of network components that interact with a network and, also, the frequency at which these interactions occur. These interactions produce a combinational explosion of heterogeneous networks composed of many different network components each having a distinct configuration. This combinational explosion of heterogeneous networks is further complicated by the possibility that an initial network configuration changes over time as network components are added and removed from the network.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 2 illustrates selected elements of exemplary network resource and association file 200.

FIG. 3 is an illustration of an exemplary current network state snapshot 300.

FIG. 4 is an exemplary illustration of network resource wrapper function call 400 with possible function parameters.

FIG. 5 illustrates exemplary network configuration request 500.

DETAILED DESCRIPTION

Embodiments of the invention provide a number of functions within a network including: automatic configuration of dynamic networks, reconfiguring networks based on possible device transitions, and executing network scenarios. The term network scenario refers to a sequence of events associated with configuring a network and/or transitioning one or more nodes within the network. A network scenario may also include a sequence of events associated with validating and/or verifying the configured network and/or transitioned nodes. For ease of discussion the term configure is hereinafter used to mean both configure and reconfigure.

Overview of the Functional Layers

Figure 1:
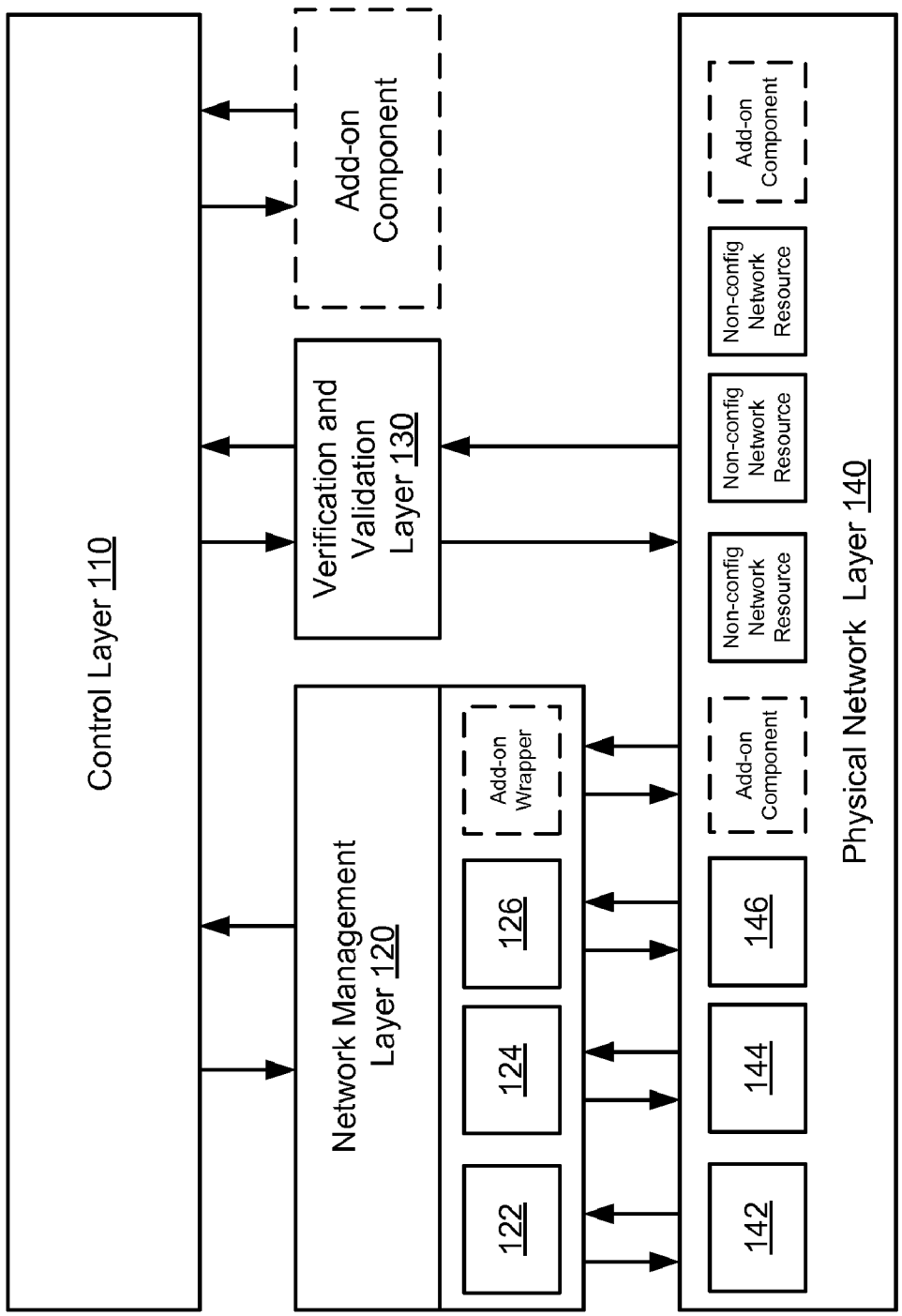
FIG. 1 is block diagram illustrating an embodiment of the invention abstracted into four layers.

To provide the above stated functions, embodiments of the invention may be abstracted into four layers: the control layer, the network management layer, the verification and validation layer, and the physical network layer. FIG. 1 is a block diagram illustrating an embodiment of the invention abstracted into four layers. In alternative embodiments of the invention, the functions may be abstracted into more layers or fewer layers. FIG. 1 includes control layer 110, network management layer 120, verification and validation layer 130, and physical network layer 140.

Control layer 110 may provide a single control point for functions provided by embodiments of the invention. Control layer 110 may be accessed through a console directly on a node in close proximity to the network or through a remote login session (e.g., Telnet). The functions of control layer 110 include generating network scenarios and directing the other layers to configure and transition the network based on the generated network scenarios, in an embodiment of the invention.

Network scenarios may be generated randomly or may be based on predefined network configurations, in an embodiment of the invention. Also, control layer 110 may generate a series of network scenarios back-to-back. Each series of network scenarios can be reproduced by supplying a seed logged in past scenarios, in an embodiment of the invention. Randomly generating network scenarios is further described below with respect to FIG. 11 and FIG. 12.

Control layer 110 determines the current physical layout and state of the network based on its interactions with network management layer 120 and verification and validation layer 130, in an embodiment of the invention. As will be further described below, control layer 110 accesses network management layer 120 to perform network configurations and network transitions. Transitioning a node broadly refers to, for example, transitioning a node from a first network interface to a second interface, and/or from a first subnet to a second subnet, and/or from a first Virtual Local Area Network (VLAN) to a second VLAN, and/or from a first topology to a second topology. The term network transition refers to transitioning one or more nodes within the network.

Network management layer 120 provides a number of functions including network configurations, network transitions, and maintenance of current network state information, in an embodiment of the invention. Network management layer 120 may be a stand-alone component for managing and reconfiguring network components. In alternative embodiments of the invention, network management layer 120 functions in association with the other layers illustrated in FIG. 1. In such an embodiment, the other layers may obtain network state information from network management layer 120.

FIG. 2 illustrates selected elements of exemplary network resource and association file 200. Network resource and association file 200 includes: dynamic network device section 202, non-dynamic network device section 204, power management device section 206, hubs section 208, Virtual Local Area Network (VLAN) switch section 210, router section 212, Dynamic Host Configuration Protocol (DHCP) server section 214, and addressing scheme section 216. A DHCP server refers to a network component that provides network administrative services in compliance with Request For Comments 2131 entitled, "Dynamic Host Configuration Protocol," R. Droms, March 1997. As illustrated in FIG. 2, network resource and association file 200 describes available network resources and associations in a standardized syntax. Related U.S. patent application Ser. No. 10/611,596 further describes network resource and association files.

Network management layer 120, in an embodiment of the invention, is responsible for configuring networks and transitioning networks. As is further discussed below in regard to FIG. 4, network resource wrappers 122, 124, and 126 may be used to configure and transition networks. In addition, network management layer 120 may maintain IP address allocation for network components and generate a readable text file that reports each IP address to facilitate communication across the network. After each network configuration and/or transition, network management layer 120 may generate a snapshot of the current network state.

FIG. 3 is an illustration of an exemplary current network state snapshot 300. The illustrated embodiment of current network state snapshot 300 is organized according to one or more subnets sections (e.g., subnet section 305). Each subnet section contains information about one or more network components within the subnet (e.g., node section 310). Node section 310 includes information about potential movement. Information about potential movement may include a list of network topologies based on network topologies and interfaces available to the node. For example, if a node contains an 802.11a network adaptor (and an 802.11a access point exists on the network), the node is able to make a transition to a wireless network connection. Network state snapshot 300 is more fully described in related U.S. patent application Ser. No. 10/611,786.

After a network transition, multiple sections of network state snapshot 300 may be updated since some network transitions affect multiple network components. Network management layer 120 uses network resource wrappers to programmatically configure network components, in an embodiment of the invention. Network resource wrappers abstract the functionality of a network component in a standardized way that allows network components to be interchanged when the components provide the same (or similar) functionality, in an embodiment of the invention. The term programmatically broadly refers to action performed by a software, hardware, and/or firmware resource of one or more network components.

FIG. 4 is an exemplary illustration of network resource wrapper function call 400 with possible function parameters. Network resource wrapper function call 400 may be used, for example, to configure a VLAN switch. A person of ordinary skill in the art appreciates that similar network components may be configured with similar network resource wrapper function calls. In an embodiment of the invention, there is a network resource wrapper corresponding to each configurable network component in a network. Table 1 provides a description of the fields of exemplary network resource wrapper function call 400.

TABLE 1

| Field | Description |
| --- | --- |
| IPAddr 405 | IPAddr 405 is the IP address from which the VLAN switch can be configured, in an embodiment of the invention. |
| Passwd 410 | Passwd 410 may be used to, for example, enable a Telnet session to the VLAN switch. |
| TotalPorts 415 | TotalPorts 415 represents the total number of ports on the VLAN switch. |
| ControlPort 420 | ControlPort 420 is the port from which the VLAN switch is being controlled, in an embodiment of the invention. |
| VLAN1, VLAN2, . . . , VLANn 425 | VLAN1, VLAN2, . . . , VLANn 425 provides one or more fields for representations of ports that are to be added to each VLAN. |

Referring again to FIG. 1, verification and validation layer 130 abstracts all devices that are used to verify and validate the current network configuration. These devices may include, for example, packet sniffers, traffic generators, and other network validation devices. In an embodiment of the invention, third party verification tools and/or proprietary tools can be added to this layer to provide seamless accessibility to a wide range of network analysis and traffic generation tools.

In an embodiment of the invention, the network validation devices are mobile. For example, during network scenario execution, network validation devices may be placed on the particular subnet that requires validation. In contrast, conventional network validation typically involves the manual movement of validation devices from one subnet to another, and/or one VLAN to another, and/or one network interface to another.

Control layer 110 interoperates with verification and validation layer 130 to perform graceful state recovery, in an embodiment of the invention. During the execution of a network scenario, verification and validation layer 130 detects and logs results to report to the control layer. Control layer 110 determines whether to perform graceful state recovery based on the errors, if any, logged and reported by the verification and validation layer. Graceful state recovery refers to reconfiguring network components to a state they were in before an error occurs during the execution of a network scenario.

Physical network layer 140 contains the physical network resources of network 100 (e.g., physical network resources 142, 144, and 146). In an embodiment of the invention, physical network resources 142, 144, and 146 correspond to the network resource wrappers 122, 124, and 126 described above with respect to FIG. 4. Control layer 110 may request the functionality of the physical network resources 142, 144, and 146 through a network configuration request.

FIG. 5 illustrates exemplary network configuration request 500. Network configuration request 500 includes subnet group section 505 and device section 510. Subnet group section 505 may be used to organize a plurality of subnet subsections (e.g., subnet subsection 515). Each subnet subsection may list information about the type of network topology requested for the subnet. For example, a particular subnet may include both wired and wireless network topologies. Device section 510 may include information about nodes within a requested network configuration and a start position for mobile nodes within a requested network configuration. Network configuration requests are more fully described in related U.S. patent application Ser. No. 10/611,786.

In operation, control layer 110 may send a network configuration request to network management layer 120. Network management layer 120, in turn, may use network resource wrappers to programmatically configure the physical resources in physical network layer 140. When new physical resources are added to network 100, corresponding network wrappers may be written to network management layer 120 to abstract the functionality of the new resource. In an embodiment of the invention, non-configurable network resources may be added and/or removed from network 100 at will because network resource wrappers are not needed to interact with non-configurable network resources.

Interactions Among the Layers

Figure 6:
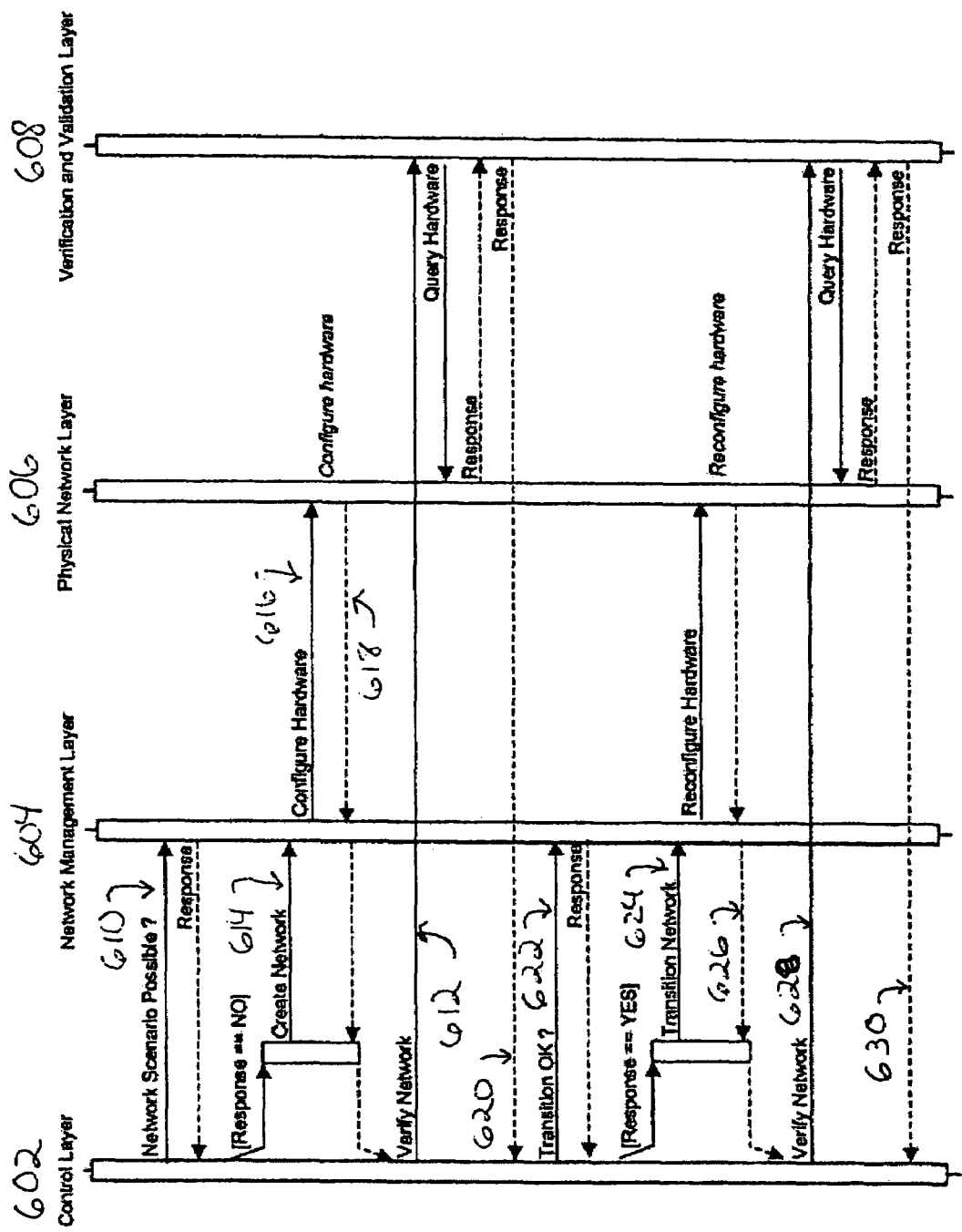
FIG. 6 is a conceptual illustration of selected interactions between abstract functional layers in network 600, according to an embodiment of the invention.

FIG. 6 is a conceptual illustration of selected interactions between abstract functional layers in network 600, according to an embodiment of the invention. Network 600 includes control layer 602, network management layer 604, physical network layer 606, and verification and validation layer 608. A person of ordinary skill in the art will appreciate that, in alternative embodiment embodiments of the invention, network 600 may include more layers or fewer layers.

A user may provide an input to initiate a network scenario, in an embodiment of the invention (not shown). Control layer 602 queries network management layer 604 to determine if executing the network scenario is possible given the current network configuration at 610. If the network scenario is supported in the current network configuration, control layer 602 initiates network verification and validation at 612.

Otherwise control layer 602 resolves the network scenario into a network configuration and creates a corresponding network configuration request at 614. The network configuration request may contain one or more subnets as well as the starting position on the network for mobile nodes. Network management layer 604 configures the network at 616 and reports success or failure of the configuration at 618. If network management layer 604 does not report any failures occurring during the configuration process, control layer 602 triggers the verification and validation layer 608 at 612. Verification and validation layer 608 performs network verification and/or validation tests and reports the findings to control layer 602 at 620.

A network scenario may include transitioning one or more nodes. For example, a network scenario may include transitioning a node from a wired LAN connection to a wireless LAN connection. Control layer 602 queries network management layer 604 to determine whether a transition is supported by the network configuration at 622. If the transition is supported then control layer 602 requests the transition at 624. Network management layer 604 reports success or failure of the transition at 626. If the transition is successful, control layer 602 prompts verification and validation layer 608 to perform appropriate tests at 628 and report the findings to control layer 602 at 630.

Embodiments of the invention may iterate the network configuration and transition processes to enable multiple network scenarios to occur one after another. Alternatively, the network scenario process may terminate after a single iteration. In such an embodiment, the findings of the completed network scenario may be reported to a user and a pseudo-random seed to reproduce the network scenario may be stored. Random generation of network scenarios is further described below with regards to FIG. 12.

Turning now to FIGS. 7-12, the particular methods associated with embodiments of the invention are described in terms of computer software and hardware with reference to a flowchart. The methods to be performed by a control layer and/or a management layer may constitute state machines or computer programs made up of computer-executable instructions. Describing the methods by reference to a flowchart enables one of ordinary skill in the art to develop such programs including such instructions to carry out the methods on suitably configured computing devices (e.g., one or more processors of a network element) executing the instructions from computer-accessible media. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, process, procedure, agent, application, etc.), as taking an action or causing a result. Such expressions are merely a shorthand way of saying that execution of the software by a computing device causes the device to perform an action or produce a result. For ease of discussion, the entities performing the functions of each layer are hereinafter referred to as agents. For example, the entity (or entities) performing the functions of the control layer is referred to as the control agent. An agent may be executable content, control logic, firmware, or some combination thereof, in an embodiment of the invention.

Figure 7:
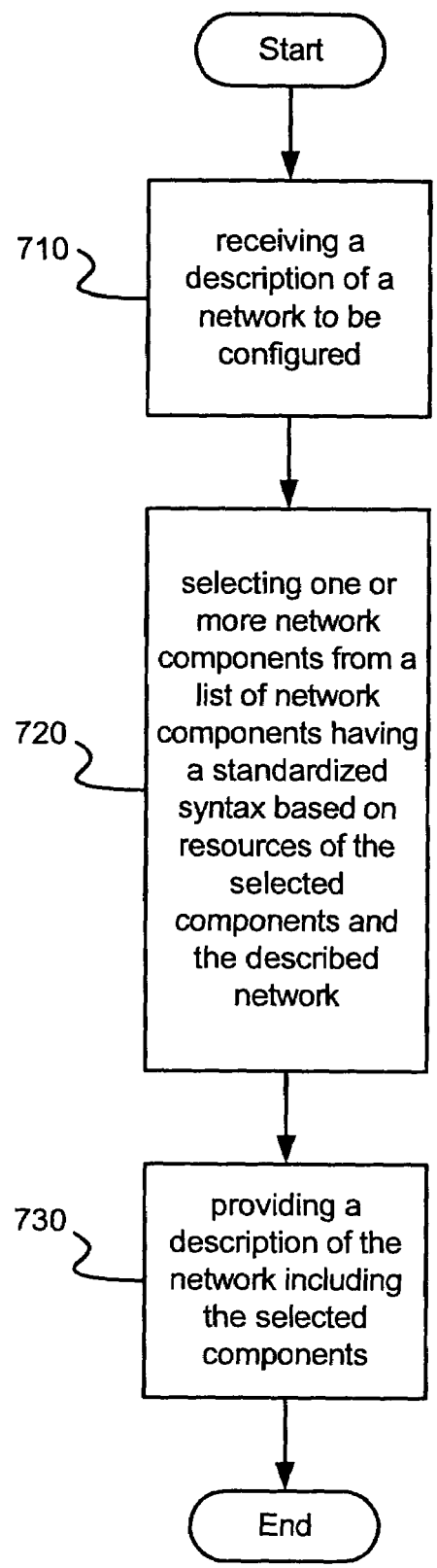
FIG. 7 is a flow diagram illustrating certain aspects of a method for automatically configuring a node according to an embodiment of the invention.

FIG. 7 is a flow diagram illustrating certain aspects of a method for automatically configuring a network according to an embodiment of the invention. Referring to process block 710, a network management agent (not shown) receives a description of a network to be configured. In an embodiment of the invention, the network management agent resides on a DHCP server. In an alternative embodiment of the invention, the network management agent may reside on a control node. A person of ordinary skill in the art appreciates that the network management agent may reside on any of a number of different network components or may be distributed among a number of network components.

The received description of a network to be configured may be human-readable. The term human-readable refers to a description that when displayed on an output device (e.g., a monitor, printer, etc.) is understandable to a human reader. The received description may be randomly generated or it may be a predetermined description of a network to be configured. If the received description is predetermined, then it may be received from a database of predetermined network descriptions or the description may be provided by a user. In an embodiment of the invention, the received description has a standardized syntax. Network configuration request 500 shown in FIG. 5 is but one example of a received description of a network having a standardized syntax.

Referring to process block 720, in an embodiment of the invention, the network management agent selects one or more network components from a list of network components. The selection may be determined, at least in part, on whether the resources of the selected network component provide a resource requested in process block 710. For example, in an embodiment of the invention, the network management agent references a list of network components (e.g., network resource and association file 200, shown in FIG. 2). The network management agent may then populate a virtual map (e.g., in memory) to correspond to the network to be configured from the referenced list of network components, based on the received description of a network to be configured.

Referring to process block 730, in an embodiment of the invention, the network management agent creates a snapshot of the configured network. The created snapshot, however, includes the one or more selected network components, in an embodiment of the invention. The description provided in process 730 is a snapshot of the network to be configured including the selected network elements, in an embodiment of the invention (e.g., current network state snapshot 300, shown in FIG. 3).

Figure 8:
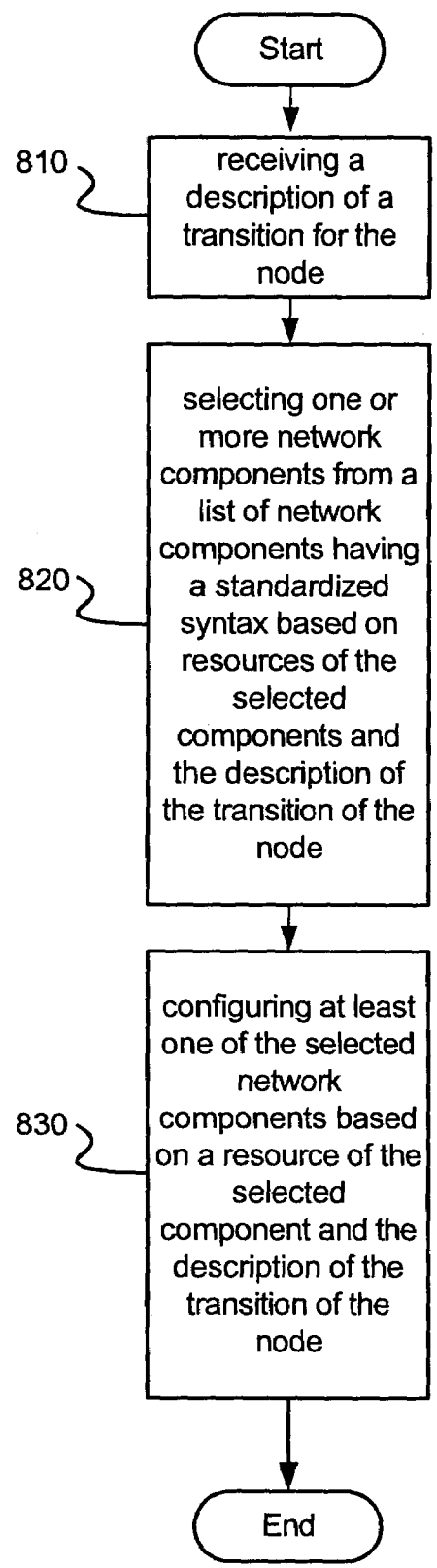
FIG. 8 is a flow diagram illustrating certain aspects of a method for automatically transitioning a node according to an embodiment of the invention.

FIG. 8 is a flow diagram illustrating certain aspects of a method for automatically transitioning a node, according to an embodiment of the invention. Referring to process block 810, a network management agent receives a description of a transition for the node. Transitioning a node broadly refers to, for example, transitioning a node from a first network interface to a second interface, and/or from a first subnet to a second subnet, and/or from a first VLAN to a second VLAN, and/or from a first topology to a second topology.

In an embodiment of the invention, the received description has a standardized syntax (e.g., the syntax illustrated in FIG. 5). The received description may be human-readable when displayed on an output device (e.g., a display screen or a printer). The received description may be generated in a number of different ways. For example, the received description may be randomly generated in the control layer and passed to a function in the network management layer to initiate the transition. Also, the received description may be provided by a user (e.g., a system administrator) who wants to implement a specified node transition.

Transitioning a node typically requires configuring the resources of one or more network components. Referring to process block 820, the network management agent selects a network component, from a list of network components, to support the node transition described in process block 810. In an embodiment of the invention, the list of network components has a standardized syntax (e.g., network resource and association file 200, shown in FIG. 2). The determination of which network components to select may be specified by the control layer (and/or a user) in a function call.

In an embodiment of the invention, selecting a network element may include referencing the list of network components to identify resources that are available within a network. The network management agent may create a virtual map of an existing network based on the referenced list of network components. The network management agent may then compare the received description of the node transition with the virtual map of the existing network and select appropriate resources to support the node transition (e.g., a VLAN switch, and/or an access point, and/or a power on/off module). In an embodiment of the invention, the network management agent then populates another virtual map that corresponds to the network after the node transition with the selected resources.

Referring to process block 830, the selected network components are configured to support the described node transition. The configuration of the selected network components may be based on resources of the selected network component and the received description of the node transition. For example, configuring a router may include associating a network interface of the router with the node to be transitioned. Similarly, configuring a VLAN switch may include associating the node to be transitioned with a VLAN of the VLAN switch. The configuration of network components is further described below with regards to FIG. 9.

Figure 9:
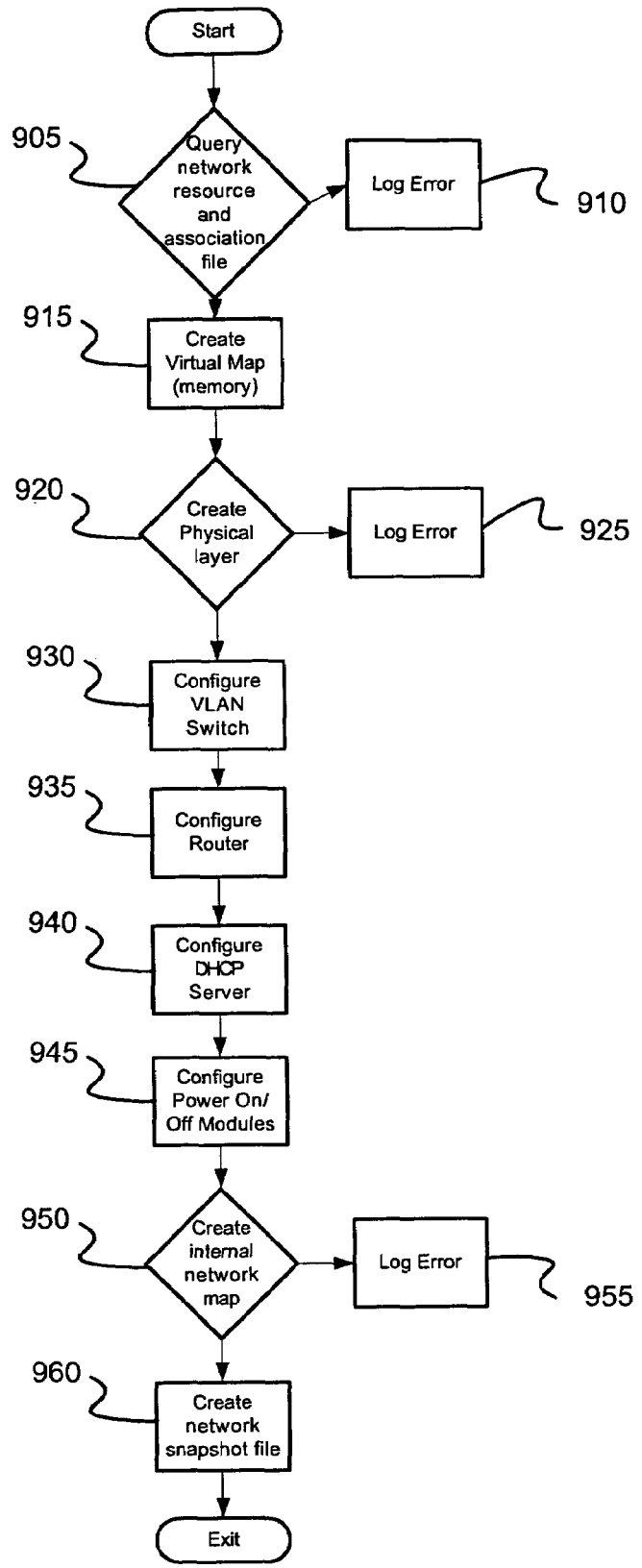
FIG. 9 is a more detailed flow diagram illustrating selected aspects of a method for configuring a network according to an embodiment of the invention.

FIG. 9 is a flow diagram illustrating selected aspects of a method for configuring a network, according to an embodiment of the invention. Referring to process block 905, the network management agent may query a list of available network components. In an embodiment of the invention, the queried list has a standardized syntax and is called the network resource and association file (e.g., network resource and association file 200, shown in FIG. 2). Process block 910 illustrates that the network management agent logs an error if it is unable to query the network resource and association file.

Referring to process block 915, the network management agent reads and parses the available resources listed in the network resource and association file. The network management agent creates a virtual map of available network components and the associations between the available network components. The virtual map is created in volatile memory (e.g., random access memory), in an embodiment of the invention.

Referring to process block 920, the network management agent creates a logical map of the network to be configured. In an embodiment of the invention the logical map of the network to be configured is created using selected resources from the network resource and association file (or the virtual map of process block 915). The selection of resources is based, in part, on a request for a particular network configuration. Which resources are selected is also determined, at least in part, on which resources are available within the network (e.g., as listed in the network resource and association file or are present in the virtual map of process block

915). Process block 925 illustrates that an error may be logged if any of the requested network resources are not available.

Referring to process blocks 930, 935, 940, and 945 a number of selected network elements are configured. The configuration of the selected network elements is based, in part, on the requested network configuration and, in part, on the available resources of the selected network elements. The configuration of network elements shown in FIG. 9 is similar to the configuration of network elements described above with regards to FIG. 8.

Referring to process block 930, a VLAN switch is configured, in an embodiment of the invention. Configuring a VLAN switch broadly refers to associating one or more VLAN switch ports with a particular VLAN (in effect associating every network component connected to the ports with a particular VLAN). The connections between VLAN switch ports and network components may be specified in an electronic file. In an embodiment of the invention, a software agent programmatically sets, configures, and/or reconfigures the VLAN switch by interacting with the VLAN switch to alter its state. A person of ordinary skill the art appreciates that the type of interaction used to alter the state of a network component depends on the particular network component.

Referring to process block 935, a router is configured. A router may provide a number of network interfaces, in an embodiment of the invention. Each network interface may be associated with IP address information (e.g., interface IP address and subnet) to enable the exchange of packets with the interface. The IP address information for each interface may be specified by an electronic file(s). Configuring the router broadly refers to, inter alia, programmatically setting, configuring, and/or reconfiguring the one or more network interfaces by interacting with router to alter its state. A person of ordinary skill in the art appreciates that the type of interaction used to alter the state of a network component depends on the particular network component.

Referring to process block 940, a DHCP server is configured. In an embodiment of the invention, a DHCP server provides network administrative functions (e.g., providing IP address information to nodes within the network). The DHCP server may associate one or more network interfaces with corresponding IP address information (e.g., IP address, subnet mask, and gateway). The associations between network interfaces and corresponding IP address information determine which nodes receive which network administrative functions. In an embodiment of the invention, the associations between network interfaces and corresponding IP address information is contained in an electronic file. Configuring the DHCP server broadly refers to, inter alia, programmatically setting, configuring, and/or reconfiguring the DHCP server by interacting with the DHCP server to alter its state. A person of ordinary skill in the art appreciates that the type of interaction used to alter the state of a network component depends on the particular network component.

Referring to process block 945, a power on/off module is configured. In an embodiment of the invention, power on/off modules may be associated with network components (e.g., hubs and access points). Configuring the power on/off modules broadly refers to, inter alia, programmatically powering on or off the power on/off modules by interacting with the power on/off modules to alter their state. A person of ordinary skill in the art appreciates that the type of interaction used to alter the state of a network component depends on the particular network component.

Referring to process block 950, the network management agent creates an internal file that provides detailed information about the network to be configured. This internal file may be used, for example, to specify which network components are associated with the network to be configured so that those devices may be transitioned, if necessary. In an embodiment of the invention, a network state snapshot file (e.g., current network state snapshot 300, shown in FIG. 3) is provided in process block 960.

Figure 10:
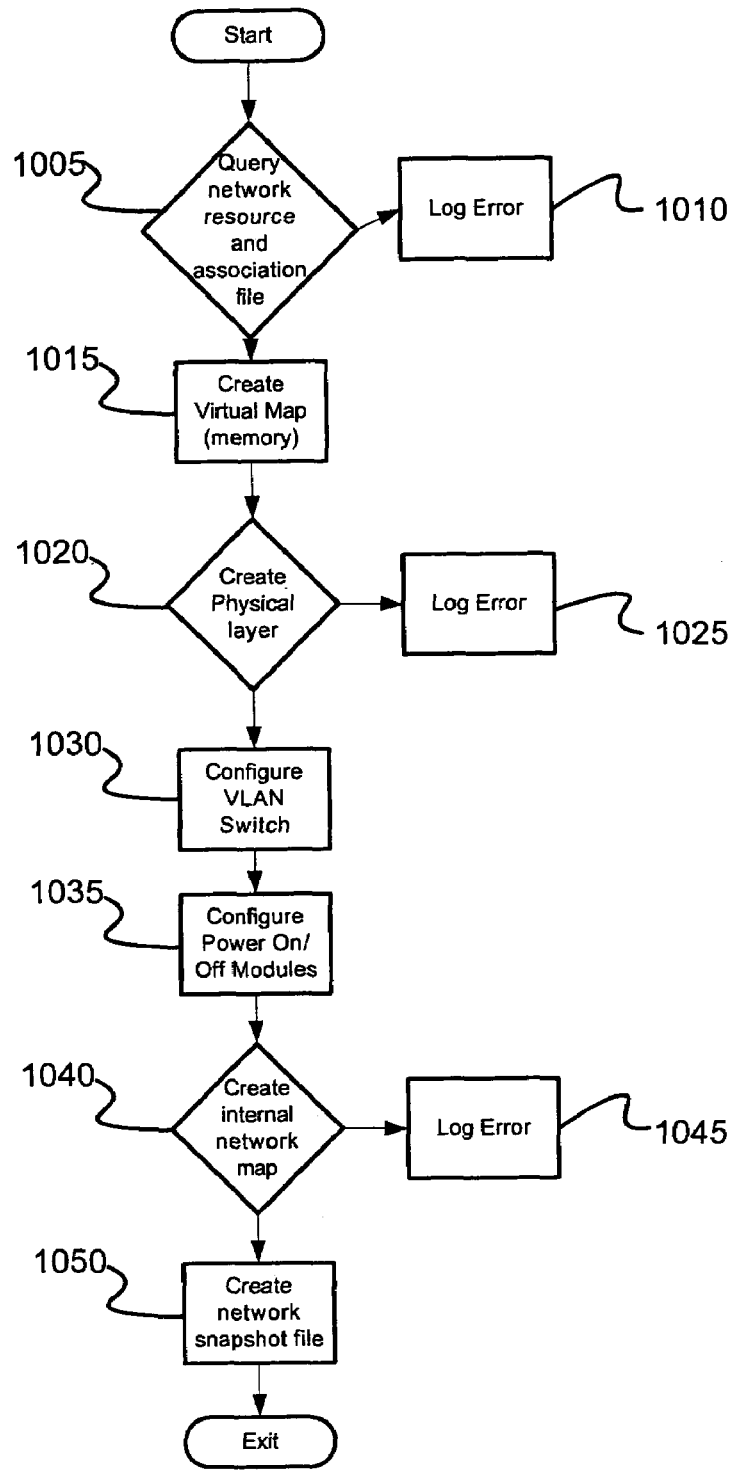
FIG. 10 is a more detailed flow diagram illustrating selected aspects of a method for network transition according to an embodiment of the invention.

FIG. 10 is a flow diagram illustrating selected aspects of a method for network transition, according to an embodiment of the invention. Referring to process block 1005, the network management agent queries a list of available network components. In an embodiment of the invention, the network management agent may execute this query, for example, in response to receiving a request to transition one or more nodes. A request to transition one or more nodes often follows the network configuration process described above with respect to FIG. 9. The transition request may be performed by calling a function, in an embodiment of the invention. Transitioning one or more nodes may be automatically performed following the network configuration process, in an embodiment of the invention. The network management agent may log an error if it is unable to query the network resource and association file, as shown by process block 1010.

Referring to process block, the network management agent reads and parses the internal network map. The network management agent, in an embodiment of the invention, creates a virtual map of available network components and the associations between the available network components. The virtual map may be created, for example, in volatile memory (e.g., random access memory).

Referring to process block 1020, the network management agent creates a logical map of a network to be transitioned. In an embodiment of the invention, the logical map of the network to be transitioned is created using selected resources from the virtual map of process block 1015. The selection of resources may be based, in part, on a request for a particular network transition on a specific network node. The selection of resources may also be based, at least in part, on which resources are available within the network (e.g., present in the virtual map of process block 1015). Process block 1025 illustrates that an error may be logged if any of the requested network resources are not available.

Referring to process block 1030, a VLAN switch is configured. In an embodiment of the invention, the network management agent programmatically configures a VLAN switch to include a node that is being transitioned in a VLAN associated with the VLAN switch. For example, the network management agent may call a function to interact with the VLAN switch and change its state so that a node is associated with a specified VLAN of the VLAN switch.

One or more power on/off modules may be configured as shown in process block 1035. The power on/off modules are used to interrupt the links that connect the nodes to be transitioned with the network, in an embodiment of the invention. The network management agent may then provide updated configuration information to the nodes to be transitioned responsive to a request from the nodes for configuration information. The power on/off modules may be programmatically configured, for example, by calling a function to interact with the power on/off modules and change their state, in an embodiment of the invention.

Referring to process block 1040, the network management agent may create an internal file that provides detailed information about the transitioned network. Also, the network management agent may create the network snapshot file of process block 1050, in an embodiment of the invention.

Figure 11:
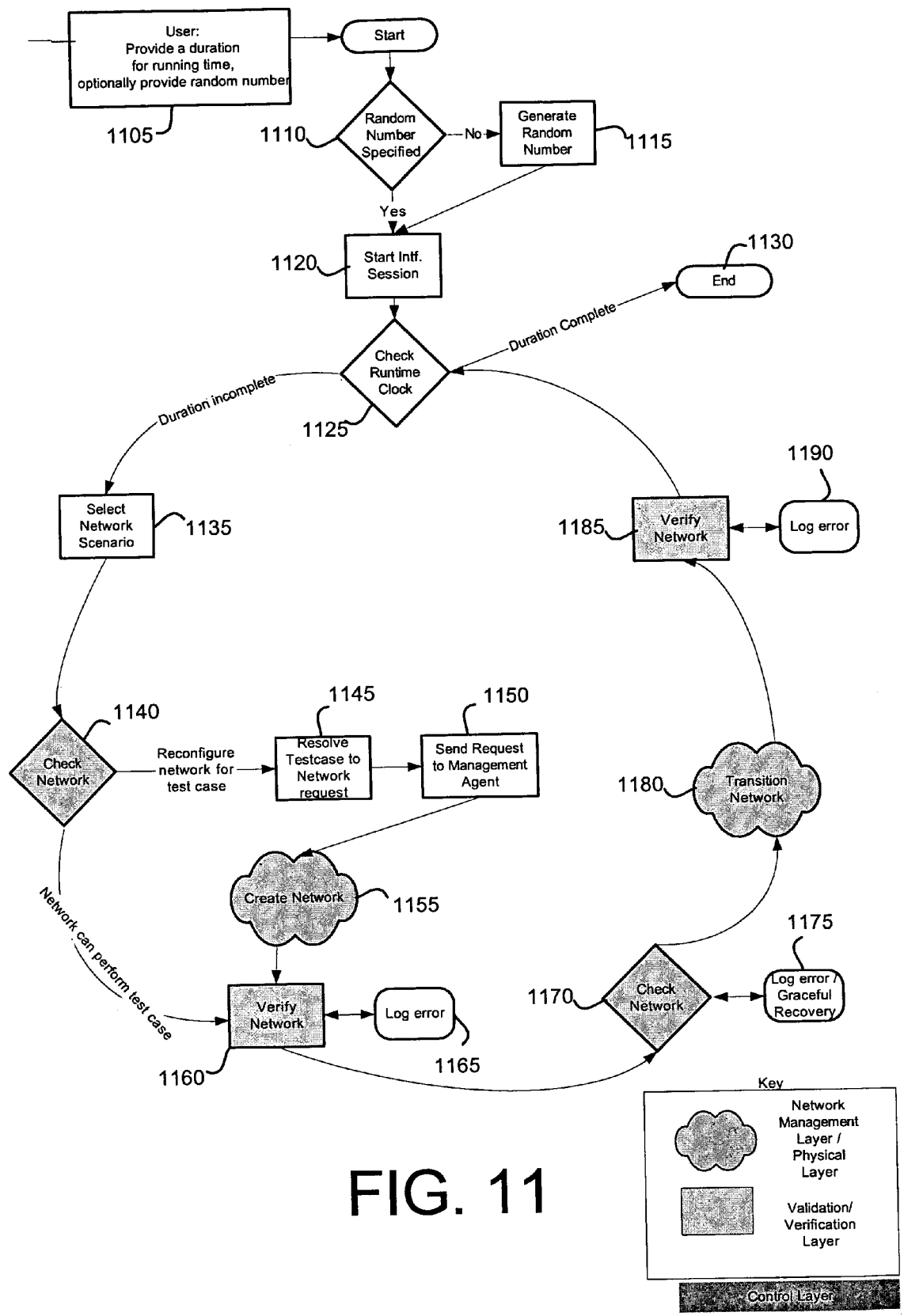
FIG. 11 is a flow diagram illustrating selected aspects of a method for controlling network configuration and transition according to an embodiment of the invention.

FIG. 11 is a flow diagram illustrating selected aspects of a method for controlling network configuration and transition according to an embodiment of the invention. A control agent, according to an embodiment, running on a control node may execute the process illustrated in FIG. 11. In an alternative embodiment of the invention, the control agent may be distributed over two or more network components. In some embodiments of the invention, the control agent may reside on the same network component as the network management agent while in alternative embodiments of the invention, the control agent and the network management agent may reside on separate network components. For example, the control agent may reside on a network control node and the network management agent may reside on a DHCP server, in an embodiment of the invention.

The control agent initiates network configurations and network transitions, in an embodiment of the invention. The control agent may generate network scenarios and automatically initiate network configurations and network transitions based on the generated network scenarios. As will be further described below with regard to FIG. 12, the network scenarios may be either randomly generated or based on predefined network configurations. The control agent manages these configurations as well as subsets and expansions of network configurations.

Referring to process block 1105, a user provides information to initiate a method for controlling a network scenario. In the illustrated embodiment, the user provides a running time and, optionally, a random number. The running time specifies a length of time that a network scenario or a series of network scenarios is allowed to run. The random number may be used to select a network scenario.

The control agent determines whether a random number has been specified in process block 1110. If a random number has not been specified, the control agent generates a random number in process block 1115. Generating a random number to specify a network scenario is further described below with regards to FIG. 12.

Referring to process block 1120, the control agent initiates an interface with the network management agent. The control agent directs the network management agent during the network scenario, network configuration, and/or network transition processes. In the illustrated embodiment of the invention, the control agent initiates the network scenario process by opening an interface with the network management agent.

The control agent references a runtime clock to determine whether the specified duration of the runtime has expired at process block 1125. If the specified duration of the runtime has expired, the control agent exits the method at process block 1130. Otherwise, the control agent selects a network scenario at process block 1135. The selected network scenario may be provided by a user or selected from a database of network scenarios. If the network scenario is selected from a database of network scenarios, the selection may be made by a user (e.g., a system administrator) or randomly selected by the control agent. Random selection of a network scenario is further described below with regard to FIG. 12.

The control agent may direct a network management agent to determine whether an existing network configuration can support the selected network scenario as illustrated in process block 1140. In an alternative embodiment of the invention, the functions of the control agent and the network management agent are performed by the same agent. The network management agent references a list of network components and their associations (e.g., the network resource and association file) to determine whether the existing network configuration supports the selected scenario. Whether an existing network supports a network scenario is based, at least in part, on whether the network scenario can be executed on the network without having to first configure the network.

Referring to process block 1145 the control agent generates a network configuration request, to reconfigure the network, if the existing network does not support the requested scenario. The network configuration request may be sent to the network management agent after being copied to a server as shown by reference numerals 1155 and 1150 respectively.

Referring to process block 1160, the network management agent verifies the network. The network management agent may use a wide variety of network validation and verification tools to verify the network. For example, the network management agent may ping one or more network elements to verify that they are reachable. The network management agent may log an error, as shown by process block 1165, if an error is detected while verifying the network.

The network management layer determines whether or not the network is valid at process block 1170. If the verification agent indicates that the network is not valid, the control agent performs a graceful recovery at process block 1175. Alternatively, if the verification agent indicates that the network is valid, the network management agent may execute a network transition at process block 1180. Network transitions are more fully described above with respect to FIG. 10.

The network management agent verifies the network transition at process block 1185. If an error is detected, the network management agent logs the error at process block 1190. The control agent may check the runtime clock to determine whether the allotted amount of time has expired at process block 1125. In an embodiment of the invention, the control layer may automatically select another network scenario for execution if the allotted amount of time has not expired.

Figure 12:
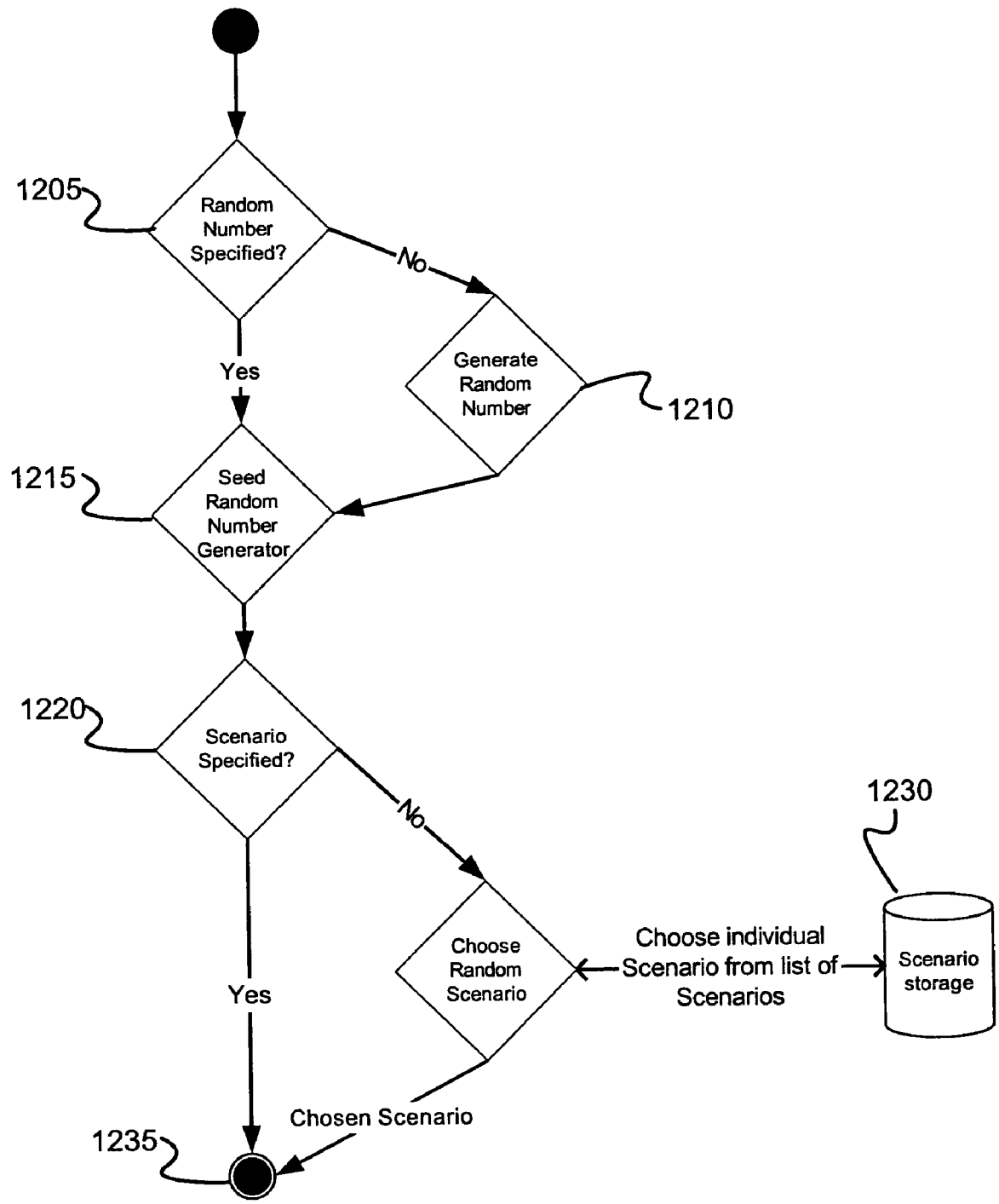
FIG. 12 is a flow diagram illustrating selected aspects of a method for randomly generating network scenarios according to an embodiment of the invention.

FIG. 12 is a flow diagram illustrating selected aspects of a method for randomly generating a network scenario, according to an embodiment of the invention. A random number generator refers to an algorithm that receives as an input a number (referred to as a seed) and provides as an output a random (or pseudo-random) series of numbers. The control agent determines whether a user has specified a seed at process block 1205. If the user has not specified a seed, the control agent generates a seed at process block 1210.

Referring to process block 1215, the control agent seeds the random number generator using the seed obtained at either process block 1205 or 1210. Random number generators are well known to those of ordinary skill in the art and will not be further described expect as to how they relate to embodiments of the invention. The control agent maintains a database of network scenarios that have been previously randomly selected based on a particular random number. If the random number generator provides a number that is already associated with a particular network scenario, then that network scenario is selected at process block 1220. Otherwise, the control agent randomly selects a network scenario based on the random number provided at process block 1215. In an embodiment of the invention, the control agent randomly selects the network scenario from the database of network scenarios shown by reference numeral 1230. The selected network scenario is provided to the control agent at reference numeral 1235.

Figure 13:
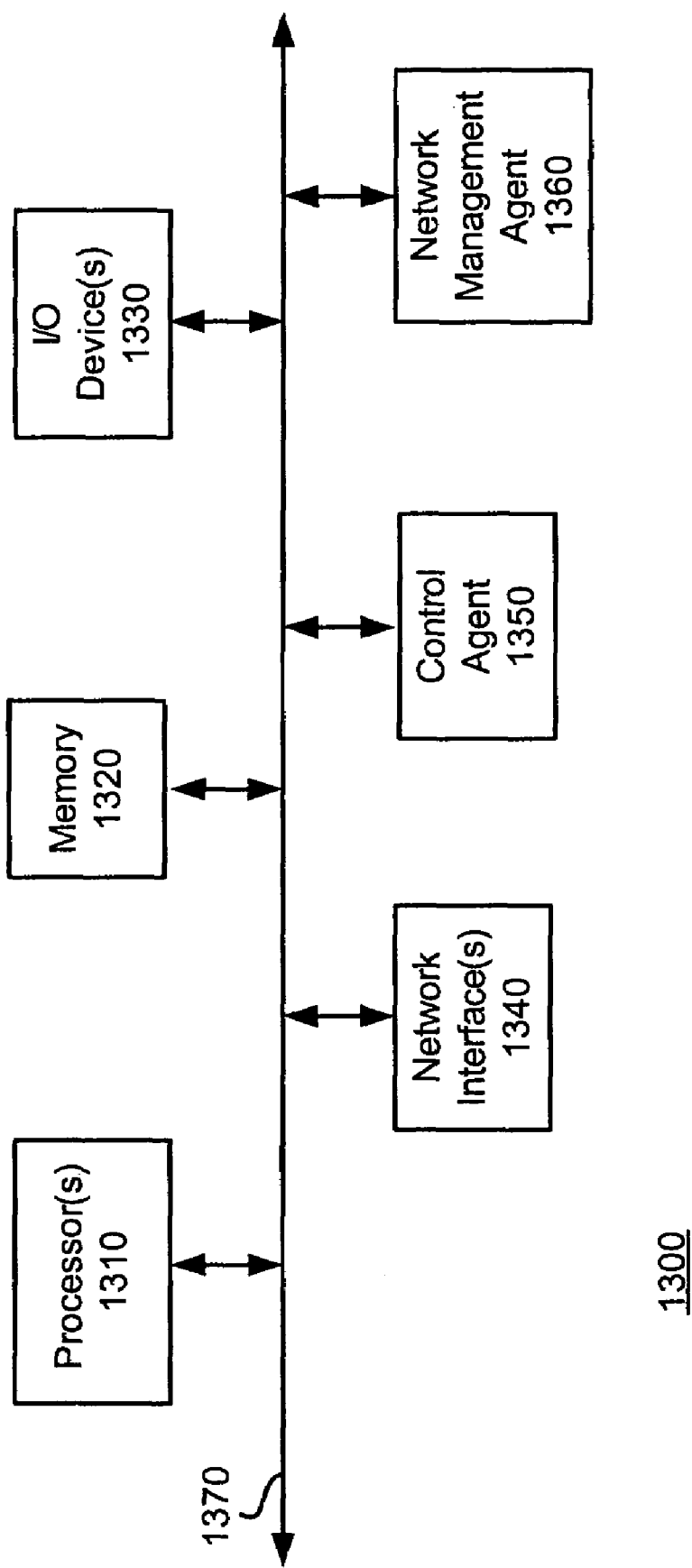
FIG. 13 is a simplified block diagram of selected elements of exemplary node 1400, implemented according to an embodiment of the invention.

FIG. 13 is a simplified block diagram of selected elements of exemplary node 1300, implemented according to an embodiment of the invention. Node 1300 may include: one or more processor(s) 1310, memory 1320, one or more Input/Output interfaces 1330, network interface(s) 1340, control agent 1350, network management agent 1360. The illustrated elements may be connected together through system interconnect 1370. Processor(s) 1310 may include a microprocessor, microcontroller, field programmable gate array (FPGA), application specific integrated circuit (ASIC), central processing unit (CPU), programmable logic device (PLD), and similar devices that access instructions from system storage (e.g., memory 1320), decode them, and execute those instructions by performing arithmetic and logical operations. In some embodiments of the invention, processor(s) 1320 is implemented with a plurality of processors.

Memory 1320 may encompass a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. Memory 1320 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory 1320 may store program modules such as routines, programs, objects, images, data structures, program data, and other program modules that perform particular tasks or implement particular abstract data types that facilitate system use.

One or more I/O interfaces 1330 may include a hard disk drive interface, a magnetic disk drive interface, an optical drive interface, a parallel port, serial controller or super I/O controller, serial port, universal serial bus (USB) port, a display device interface (e.g., video adapter), a sound card, modem, and the like.

Network interface(s) 1340 may include a wide variety of software, hardware, and/or firmware to interface node 1300 with an associated network (not shown). In an embodiment of the invention, network interface 1340 includes both wired (e.g., local area network) interfaces and wireless (e.g., wireless local area network) interfaces. Network interface(s) 1340 may include network interface card(s) and/or chipsets that provide a network interface.

Control agent 1350 enables node 1300 to act as a single control point for a network to which node 1300 is connected. Control agent 1350 may be executable content, control logic (e.g., ASIC, PLD, FPGA, etc.), firmware, or some combination thereof, in an embodiment of the invention. In embodiments of the invention in which control agent 1350 is executable content, it may be stored in memory 1320 and executed by processor(s) 1310.

Network management agent 1360 enables node 1300 to perform network configuration changes and network transitions, in an embodiment of the invention. Network management agent 1360 may be executable content, control logic (e.g., ASIC, PLD, FPGA, etc.), firmware, or some combination thereof, in an embodiment of the invention. In embodiments of the invention in which network management agent 1360 is executable content, it may be stored in memory 1320 and executed by processor(s) 1310. In the illustrated embodiment of the invention, network management agent 1360 resides on the same node as control agent 1350. In alternative embodiments of the invention, control agent 1350 and network management agent 1360 reside on separate nodes. In yet other alternative embodiments of the invention, control agent 1350 and/or network management agent 1360 are distributed across more than one node.

System interconnect 1370 permits communication between the various elements of node 1370. System interconnect 1370 may include a wide variety of signal lines including one or more of a memory bus, peripheral bus, local bus, host bus, bridge, optical, electrical, acoustical, and other propagated signal lines.

Figure 14:
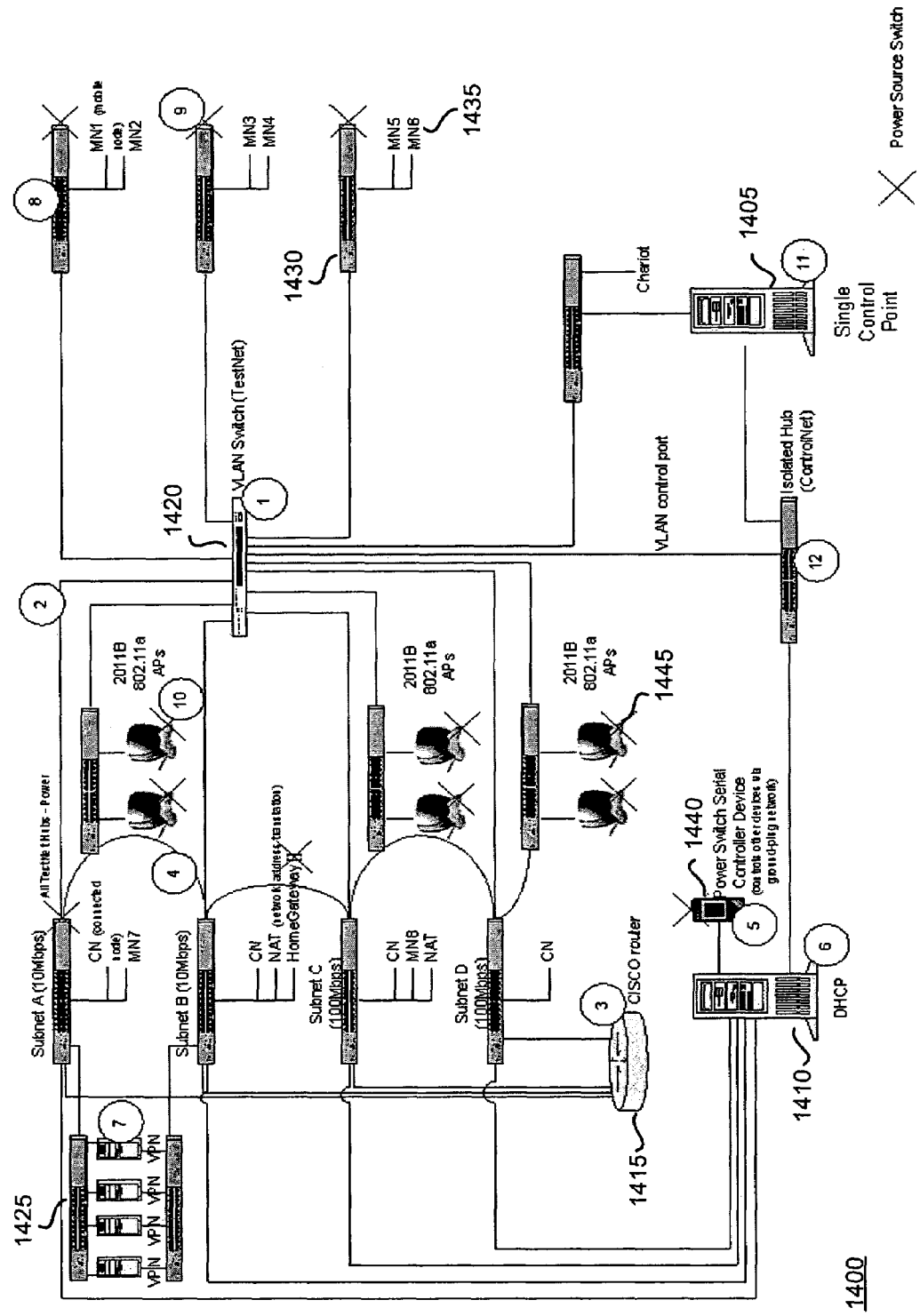
FIG. 14 is a block diagram of selected elements of exemplary network 1400, implemented according to an embodiment of the invention.

FIG. 14 is a block diagram of selected elements of exemplary network 1400, implemented according to an embodiment of the invention. Network 1400 includes control node 1405, DHCP server 1410, router 1415, VLAN switch 1420, VPN 1425, hub 1430, and node 1435, power switch serial controller device 1440, and access point 1445.

Control node 1405 provides a single control point for executing network configurations, network transitions, and/or network scenarios, in an embodiment of the invention. A control agent (e.g., control agent 1350) resides on control node 1405 in an embodiment of the invention. In alternative embodiments of the invention, a control agent and a network management agent (e.g., network management agent 1340) reside on control node 1405. Control node 1405 may be a general purpose computing device containing a control agent, in an embodiment of the invention.

DHCP server 1410 provides network administrative functions in an embodiment of the invention. For example, DHCP server 1410 may provide IP addresses, subnet masks, and/or gateway information to network components of network 1400. The DHCP server may associate one or more network interfaces with corresponding IP address information (e.g., IP address, subnet mask, and gateway). The associations between network interfaces and corresponding IP address information determine which nodes receive which network administrative functions, in an embodiment of the invention. DHCP servers are well known to those of ordinary skill in the art and will not be further described except as to how they relate to embodiments of the invention. In an embodiment of the invention a network management agent resides on DHCP server 1410. In such an embodiment of the invention, DHCP server 1410 may be referred to as a network management node. The term network management node broadly refers to a node on which a network management agent (or a portion of a network management agent) resides.

Router 1415 provides a number of network interfaces in an embodiment of the invention. Each network interface may be associated with IP address information (e.g., interface IP address and subnet) to enable the exchange of packets with the interface. Routers are well known to those of ordinary skill in the art and will not further described except as to how they relate to embodiments of the invention.

VLAN switch 1420 provides a plurality of ports and supports a plurality of VLANs, in an embodiment of the invention. Each supported VLAN may include one or more ports. Each port may be connected to one or more network components. VLAN switch 1420 enables an embodiment of the invention to group hubs together programmatically into logical subnets. VLAN switches are well known to those of ordinary skill in the art and will not be further described except as to how they relate to embodiments of the invention.

VPN 1425 provides a mechanism for secure transactions in an embodiment of the invention. In some embodiments of the invention, one or VPNs employ static IP address configures. In such embodiments of the invention, a network management agent may create the specific subnets used to communicate with the statically configured VPN. This may be accomplished, for example, by configuring the IP addresses on the DHCP server with the subnet IP addresses that correspond to the specific VPN. In addition, router 1415 may be configured to isolate network traffic on either side of the VPN so that only VPN traffic is routed. Internal traffic refers to traffic within the VPN (or firewall) and external traffic refers to traffic outside of the VPN (or firewall). VPNs are well known to those of ordinary skill in the art and will not be further described except as to how they relate to embodiments of the invention.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method of automatically transitioning a node comprising:
   receiving a human-readable description of a transition for the node, the human-readable description having a standardized syntax and including a subnet group section and a device section;
   selecting one or more network components from a list of network components based on resources of the selected components and the description of the transition of the node, wherein selecting one or more network components includes
      referencing the list of network components,
      creating a first virtual map of an existing network in volatile memory based on the referenced list of network components, and
      populating a second virtual map of another network in volatile memory with network components from the referenced list based on the description of transitioning the node; and
   configuring at least one of the selected network components based on a resource of the selected component and the description of the transition of the node, wherein the at least one of the selected network components has an associated network resource wrapper to provide a machine accessible and standardized description of the functionality of the at least one of the selected network components, wherein configuring the at least one of the selected network components includes programmatically altering the associated network resource wrapper.

2. The method of automatically transitioning a node of claim 1, wherein receiving the description of a transition for the node comprises:
   receiving a randomly generated human-readable description of a transition for the node.

3. The method of automatically transitioning the node of claim 1, wherein receiving the description of the transition for the node comprises:
   receiving a predetermined human-readable description of the transition for the node.

4. The method of automatically transitioning a node of claim 1, wherein receiving the description of transitioning the node:
   receiving the description of transitioning the node from a first network interface to a second network interface.

5. The method of automatically transitioning a node of claim 1, wherein receiving the description of transitioning the node having:
   receiving the description of transitioning the node from a first subnet to a second subnet.

6. The method of automatically transitioning a node of claim 1, wherein receiving the description of transitioning the node, the description having a standardized syntax comprises:
   receiving the description of transitioning the node from a first Virtual Local Area Network (VLAN) to a second VLAN.

7. The method of automatically transitioning a node of claim 1, wherein receiving the description of transitioning the node, the description having a standardized syntax comprises:
   receiving the description of transitioning the node from a first topology to a second topology.

8. The method of automatically transitioning a node of claim 1, wherein referencing the list of network components comprises:
   referencing the list of network components, the referenced list having a standardized syntax.

9. The method of automatically transitioning a node of claim 1, wherein configuring at least one of the selected network components based on a resource of the selected component and the received description of transitioning the node comprises: programmatically configuring a VLAN switch to include the node to be transitioned in a VLAN.

10. The method of automatically transitioning a node of claim 9, wherein programmatically configuring the VLAN switch to include the node to be transitioned in a VLAN comprises:
    calling a function to alter the configuration of the VLAN switch.

11. The method of automatically transitioning a node of claim 1, further comprising:
    interrupting a link that connects the node to be transitioned to a network.

12. The method of automatically transitioning a node of claim 11, further comprising:
    establishing the link that connects the node to be transitioned to the network; and
    providing configuration information to the node to be transitioned responsive to a request for configuration information.

13. The method of claim 12, further comprising:
    validating the configured network.

14. The method of claim 13, wherein validating the configured network comprises:
    sending a ping packet to the selected node to determine whether the selected node is reachable.

15. A network comprising:
    a plurality of network components; and
    a network management node to automatically transition one of the plurality of network components, the network management node coupled with the plurality of network components and having a processor and logic executable thereon to receive a human-readable description of a transition for a node, the human-readable description having a standardized syntax and including a subnet group section and a device section;

select one or more network components from a list of network components having a standardized syntax based on resources of the selected components and the description of the transition of the node, wherein selecting one or more network components includes referencing the list of network components, creating, in volatile memory, a first virtual map of an existing network based on the referenced list of network components, and populating, in volatile memory, a second virtual map of another network with network components from the referenced list based on the description of transitioning the node; and configure at least one of the selected network components based on a resource of the selected component and the description of the transition of the node, wherein the at least one of the selected network components has an associated network resource wrapper to provide a machine accessible and standardized description of the functionality of the at least one of the selected network components, wherein configuring the at least one of the selected network components includes programmatically altering the associated network resource wrapper.

16. The network of claim 15, wherein the network management node to automatically transition one of the plurality of network components, the network management node coupled with the plurality of network components and having a processor and logic executable thereon further to reference the list of network components;

create a first virtual map of a network based on the referenced list of network components; and populate a second virtual map of another network with network components from the referenced list based on the description of transitioning the node.

17. The network of claim 16, wherein the plurality of network components comprises a VLAN switch; and the network management node to automatically transition one of the plurality of network components, the network management node coupled with the plurality of network components and having a processor and logic executable thereon further to programmatically configure the VLAN switch to include the node to be transitioned in a VLAN.

18. The network of claim 17, wherein the network management node to automatically transition one of the plurality of network components, the network management node coupled with the plurality of network components and having a processor and logic executable thereon further to interrupt a link that connects the node to be transitioned to the network.

19. The network of claim 18, wherein the network management node to automatically transition one of the plurality of network components, the network management node coupled with the plurality of network components and having a processor and logic executable thereon further to provide configuration information to the node to be transitioned responsive to a request for configuration information from the node.

* * * * *